Patented Apr. 28, 1953

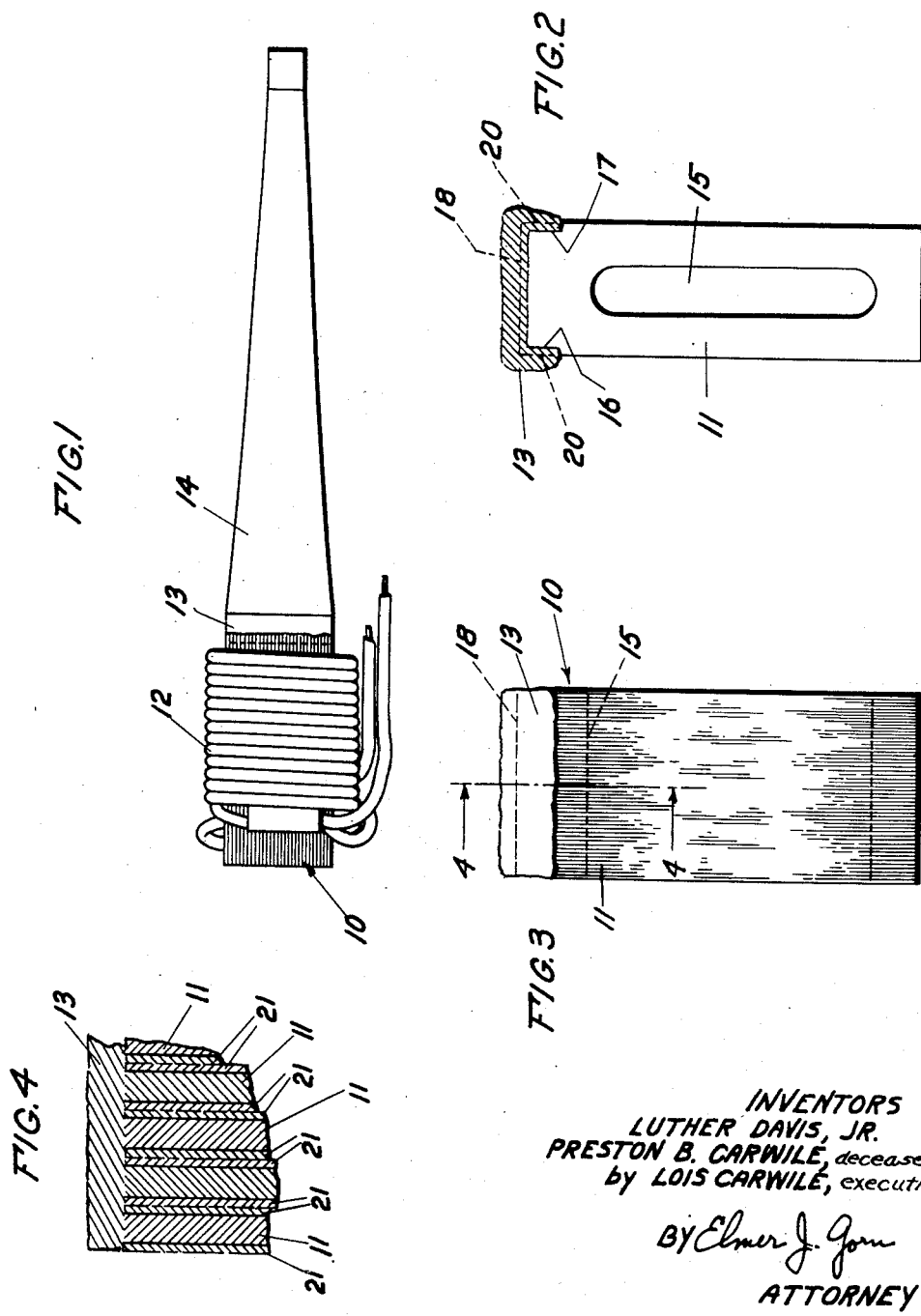

2,636,998

UNITED STATES PATENT OFFICE 2,636,998

CAP FOR MAGNETOSTRICTIVE CORE LAMINATIONS

Luther Davis, Jr., Newton Highlands, Mass., and Preston B. Carwile, deceased, late of Cambridge, Mass., by Lois C. K. Carwile, executrix, Cambridge, Mass., assignors to Raytheon Manufacturing Company, Newton, Mass., a corporation of Delaware Application December 18, 1951, Serial No. 262,232

6 Claims. (Cl. 310—26)

This application relates to welded caps for the laminations of a magnetostrictive transducer.

The cores of magnetostrictive transducers are frequently formed of laminations of a magnetostrictive material, such as nickel. These laminations are insulated from one another to prevent eddy currents being set up in the core with their consequent losses. When such a core is used in a magnetostrictive transducer to produce compressional wave energy for such purposes as drilling, it is frequently necessary to add some impedance transforming means to transmit the compressional wave energy to the work most efficiently. Heretofore, this transformer has comprised a cone of metal soldered to one end of the core of the transducer. When this is done using soldering flux, it has been found that the solder and the flux run down between the laminations shorting them out and permitting high eddy currents to flow. This condition is made worse if the soldering is done in a reducing atmosphere to eliminate the need for the flux. Under these conditions the insulating oxide coating of the laminations is reduced to a conducting metal which increases the shorting effect and the eddy current losses.

By the method of this invention, metal, preferably material of the same kind as the laminations, is flowed onto one end of the core by welding in an atmosphere of an inert gas, such as helium, while the major part of the laminated rod is maintained at a low temperature by immersion in water or other coolant. When this is done, the tips of the laminations melt to some extent to form a good bond with the added material. This added material forms a cap at the end of the laminations. The insulating oxide between the laminations breaks down in the presence of the inert helium at the welding temperature, but the heat is localized at the extreme ends of the laminations, and the oxide coating in the major part of the laminated core is not affected. No appreciable eddy currents can flow between the laminations. Furthermore, the metal cap formed in this way seals the spaces between the laminations so that the flux and solder of subsequent soldering operations cannot penetrate to short out the laminations. Such welded caps have consistently shown better mechanical strength and lower electrical losses than when the transformer is directly soldered to the stack of laminations.

Other and further advantages of this invention will be apparent as the description thereof progresses, reference being had to the accompanying drawings, wherein:

Fig. 1 is a view of a magnetostrictive transducer adapted for use as a drill with an impedance transformer serving as a drill holder attached to a magnetostrictive core capped by the methods of the invention;

Fig. 2 is a plan view of a stack of laminations wtih the cap of the present invention;

Fig. 3 is a side view of the stack of Fig. 2; and

Fig. 4 is an enlarged section along the line 4—4 of Fig. 3 showing the oxide coating between the laminations in relation to the cap.

In Fig. 1, the reference numeral 10 designates a core of laminations 11 of magnetostrictive material. This core 10 is wound with a winding 12 and has a cap 13 made of the same material as the laminations. This cap 13 is positioned at one end of the core 10. The impedance transformer means for efficiently transmitting the compressional wave energy generated in the core 10 to the work, here shown as a drilling head 14, is attached to the cap 13 by soldering or brazing, or any other convenient process. This drilling head 14 may be of the type described in the copending application of Preston B. Carwile, one of the applicants, Serial No. 128,989, filed November 23, 1949. The way in which the cap 13 is formed on the core 10 may best be seen by reference to Figs. 2 and 3. Fig. 2 shows the laminations 11 formed with a window 15 designed to accommodate the winding 12. Recesses 16 and 17 are formed in both edges of each lamination 11 near one end. These recesses are not essential, but serve to increase the bond of the cap to the laminations. Metal, preferably of the same kind as the laminations, in the form of a welding rod is deposited across the recessed end of the stack of laminations filling both recesses and covering the end of the core 10 to form a cap 13. When cooled, this cap 13 is machined down to a smooth, flat surface 18 on the end, and the part of the cap 13 extending down into the recesses 16 and 17 is machined flush with the surface of the core 10 to form a smooth surface 20.

It will be seen from Fig. 4 that the laminations 11 are covered with a layer of oxide 21 that insulates them from each other and prevents eddy currents from building up and causing excessive losses in the core 10. It will be noted that the metal of the cap 13 does not penetrate between the laminations 11, and the insulating oxide layers 21 are intact, while the cap 13 has fused with the tips of the laminations 11. It can thus easily be seen that, when the conical piece 14 is subsequently soldered or brazed to the cap 13 as shown in Fig. 1, the cap 13 prevents the solder and flux from penetrating down between the laminations 11. Thus, a good bond can be made between the conical piece 14 and the core 10 by silver brazing in an air or oxidizing atmosphere, using a flux without appreciably increasing the eddy current losses in the core 10. By the use of an atmosphere of an inert gas, such as helium, localized at the tip during the welding operation as described above, the chances of breaking down the oxide coating 21 to metal and shorting the laminations 11 are further reduced.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In a core of a magnetostrictive transducer formed of laminations, a cap of metal welded to the tips of one end of the laminations and a metal cone affixed to said cap.

2. In a core of a magnetostrictive transducer formed of laminations of magnetostrictive material, a cap of the same material as the laminations welded to the tips of one end of the laminations and a metal cone affixed to said cap.

3. In a core of a magnetostrictive transducer formed of laminations of nickel, a cap of nickel welded to the tips of one end of the laminations and a metal cone affixed to said cap.

4. In a core of a magnetostrictive transducer formed of laminations of magnetostrictive material, recesses formed in the edges of the laminations near one end and a cap of metal welded to the tips of the laminations at the recessed ends and extending into the recesses and a metal cone affixed to said cap.

5. In a core of a magnetostrictive transducer formed of laminations of magnetostrictive material, recesses formed in the edges of the laminations near one end and a cap of the same material as the laminations welded to the tips of the laminations at the recessed ends and extending into the recesses and a metal cone affixed to said cap.

6. In a core of a magnetostrictive transducer formed of laminations of nickel, recesses formed in the edges of the laminations near one end and a cap of nickel welded to the tips of the laminations at the recessed ends and extending into the recesses and a metal cone affixed to said cap.

LUTHER DAVIS, Jr.
LOIS C. K. CARWILE,
*Executrix of the estate of Preston B. Carwile, deceased.*

References Cited in the file of this patent

UNITED STATES PATENTS

| Number | Name | Date |
| --- | --- | --- |
| 1,756,672 | Barr | Apr. 29, 1930 |
| 2,116,522 | Kunze | May 10, 1938 |
| 2,448,785 | Dolan | Sept. 7, 1948 |